United States Patent [19]

Roller

[11] Patent Number: 5,640,478
[45] Date of Patent: Jun. 17, 1997

[54] SNAP-IN PROXIMAL CONNECTOR FOR MOUNTING AN OPTIC FIBER ELEMENT INTO A LIGHT SOURCE SYSTEM

[75] Inventor: Thomas W. Roller, Moorpark, Calif.

[73] Assignee: Cogent Light Technologies, Inc., Santa Clarita, Calif.

[21] Appl. No.: 502,068

[22] Filed: Jul. 14, 1995

[51] Int. Cl.$^6$ .................................................. G02B 6/36
[52] U.S. Cl. .............................................. 385/92; 385/136
[58] Field of Search ............................ 385/88–94, 136

[56] References Cited

U.S. PATENT DOCUMENTS

| | | | |
|---|---|---|---|
| 3,948,582 | 4/1976 | Martin | 385/56 |
| 4,273,413 | 6/1981 | Bendiksen et al. | 385/92 |
| 4,735,482 | 4/1988 | Yoshida et al. | 385/72 |
| 4,737,008 | 4/1988 | Ohyama et al. | 385/92 |
| 4,772,081 | 9/1988 | Borgos et al. | 385/92 |
| 4,824,202 | 4/1989 | Auras | 385/92 |
| 4,883,333 | 11/1989 | Yanez | 385/901 |
| 5,142,600 | 8/1992 | Ortiz, Jr. | 385/88 |

FOREIGN PATENT DOCUMENTS 0519219  12/1992  European Pat. Off. .

Primary Examiner—John Ngo
Attorney, Agent, or Firm—Rothwell, Figg, Ernst & Kurz

[57] ABSTRACT

The proximal connector includes a stainless steel cone-shaped ferrule enclosing a proximal end of the optic fiber element. The ferrule is inserted within a matching aperture of a receiving block which is also made of stainless steel. The matching shapes of the ferrule and the aperture of the receiving block ensure effective heat transference from the ferrule into the receiving block. Both ferrule and the aperture are axially symmetric such that any rotation of the proximal connector while inserted into the receiving block does not change the location of the entrance aperture of the optic fiber element. The proximal connector also includes a case having an indented ring. A ball plunger biasing mechanism is mounted within the aperture of the receiving block and is positioned for engaging with the indented ring only while the proximal connector is fully and securely inserted within the aperture. The plunger prevents accidental removal of the proximal connector while also providing a biasing force for ensuring solid contact between the cone-shaped ferrule and the corresponding portions of the receiving block to further facilitate the heat conduction.

12 Claims, 3 Drawing Sheets

SNAP-IN PROXIMAL CONNECTOR FOR MOUNTING AN OPTIC FIBER ELEMENT INTO A LIGHT SOURCE SYSTEM

BACKGROUND OF THE INVENTION

1. Field of the Invention

The invention generally relates to optical systems for coupling light into a single optic fiber or fiber bundle and, in particular, to a connector for connecting a single optic fiber or fiber bundle into a housing of a light source system.

2. Description of Related Art

A variety of light source systems have been developed for coupling light from a high intensity light source such as an arc lamp into an optical fiber bundle or single optical fiber. The light coupled into the bundle or single fiber may be used, for example, for medical illumination purposes such as for use with a surgical luminaire, headlamp, endoscope or borescope.

Typically, a proximal end of the single fiber or fiber bundle is mounted within a proximal connector for insertion into a slot or aperture within a housing containing the light source. A distal end of the single fiber or fiber bundle is connected to an application device, i.e., a surgical luminaire, endoscope, etc. Typically, the proximal connector is configured to be removed from the light source system. This allows a person operating the application device, such as a surgeon using a surgical headlamp, to have free mobility, which may be otherwise hindered while the fiber or fiber bundle is connected into the light source system. The provision of the removable proximal connector also allows a single light source system to be used to provide light for a variety of different application devices, each having a corresponding proximal connector.

However, problems arise in many conventional proximal connectors, particularly those designed for use with a single optic fiber. Single fibers require high intensity light to be directed onto an entrance aperture of the single fiber held by the proximal connector. Conventional proximal connectors for single fibers generally support silica fibers for which heat is not a problem. If the materials of the optical fiber are susceptible to thermal damage, a method of removing the heat is necessary to assure continued operation. For silica fibers having a polymer cladding, excess heat of a conventional connector will destroy the cladding. To remedy this problem, some previous light source systems have been configured to position the proximal entrance aperture of the single fiber some distance from the proximal connector itself. The high intensity light is then focused at the entrance aperture of the single fiber which is offset from the proximal connector itself. Hence, the proximal connector is not significantly heated. However, because the entrance aperture of the single fiber extends from the proximal connector, the fiber is unprotected and easily broken or otherwise damaged after removal from the light source system.

At least one proximal connector includes a slidable housing designed to protect the fiber. The housing retracts while the connector is mounted to the light source system to allow the single fiber to receive light. The slidable housing slides outwardly, as the connector is removed from the light source system to enclose and protect the optic fiber. See, for example, U.S. patent application Ser. No. 08/238,589, filed May 5, 1994 and entitled, "Fiber Optic Connector Having a Shield and Apparatus for Protecting the Exposed End of a Fiber Optic." Although such an arrangement protects the proximal end of the optic fiber while also minimizing heat related problems, such is achieved at the expense of requiring a complicated proximal connector having a number of moving parts susceptible to damage or malfunction.

Other problems arise with proximal connectors having an optic fiber extending beyond the connector itself. As noted above, single fibers require precise positioning of the entrance aperture of the fiber with respect to the optical components of the light source system which is complicated by having the fiber extend beyond the connector. Moreover, polishing such fibers protruding beyond the proximal connectors is difficult and not readily manufacturable.

It would be desirable to provide an improved proximal connector which avoids the disadvantages of conventional proximal connectors described above. It is to this end that aspects of the present invention are drawn.

SUMMARY OF THE INVENTION

A proximal connector for connecting an optic fiber element such as a single optic fiber or fiber bundle into a housing of a light source system is provided. The proximal connector includes a cone-shaped ferrule mounted around a proximal end of the single fiber designed for both alignment and heat sinking. The cone-shaped ferrule is sized and configured for mounting within a cone-shaped slot or aperture within a receiving block of the housing. While inserted, an exterior sidewall of the cone-shaped ferrule rests snugly against an interior sidewall of the receiving block. High intensity light is directed into an entrance aperture of the proximal end of the single fiber. The entrance aperture is aligned with a truncated end of the cone-shaped ferrule.

The cone-shaped ferrule and the receiving block are both formed of stainless steel or other metals or alloys having a high index of heat conduction. Accordingly, any heat generated within the cone-shaped ferrule from the high intensity light is conducted into the receiving block of the housing thereby keeping the cone-shaped ferrule, and the single fiber enclosed therein, relatively cool. As noted, the fiber optic does not extend from the truncated end of the cone-shaped ferrule, but lies flush therewith. Hence, upon removal from the housing, the optic fiber element is protected by the cone-shaped ferrule from possible damage. In this manner, heating problems and breakage problems are both substantially eliminated, without requiring a complicated and expensive mounting apparatus such as the type described above having a slidable external housing. Furthermore, the entrance aperture of the fiber optic can be polished because it is secured within the ferrule.

In one embodiment, the receiving block includes a spring-loaded ball plunger to ensure that the ferrule remains snugly mounted within the aperture of the receiving block. The ferrule is mounted in a case that includes an indented ring. The ball plunger and the indented ring are relatively positioned such that the ball plunger rests within the indented ring only while the ferrule is fully inserted within the aperture. When so engaged, the ball plunger prevents the ferrule from sliding out from the aperture. The ball plunger holds the ferrule in place until sufficient manual force is applied to disengage the ball plunger. By holding the ferrule in place, lateral alignment, along the direction of insertion of the ferrule, of the entrance aperture of the single fiber is ensured.

The cone-shaped ferrule and the matching aperture of the receiving block are both axially symmetric such that longitudinal alignment is also ensured. In other words, rotation of the ferrule within the aperture does not cause any displacement of the entrance aperture of the fiber but merely rotates the fiber, which itself is axially symmetric. Thus, positioning problems of the type discussed are also avoided.

Thus, the above-described problems of conventional proximal connectors are eliminated by employing the simple cone-shaped ferrule of the invention. Moreover, no moving parts are required and the cost of the proximal connector is thereby minimized. The resulting proximal connector is simply, reliably and easily manufacturable. Hence, the general objective set forth above is achieved. Other objects, advantages and features of the invention will be apparent from the descriptions which follow and from the drawings attached hereto.

DETAILED DESCRIPTION OF EXEMPLARY EMBODIMENTS OF THE INVENTION

With reference to the figures, exemplary embodiments of the invention will now be described. These embodiments illustrate principles of the invention and should not be construed as limiting the scope of the invention.

Figure 1:
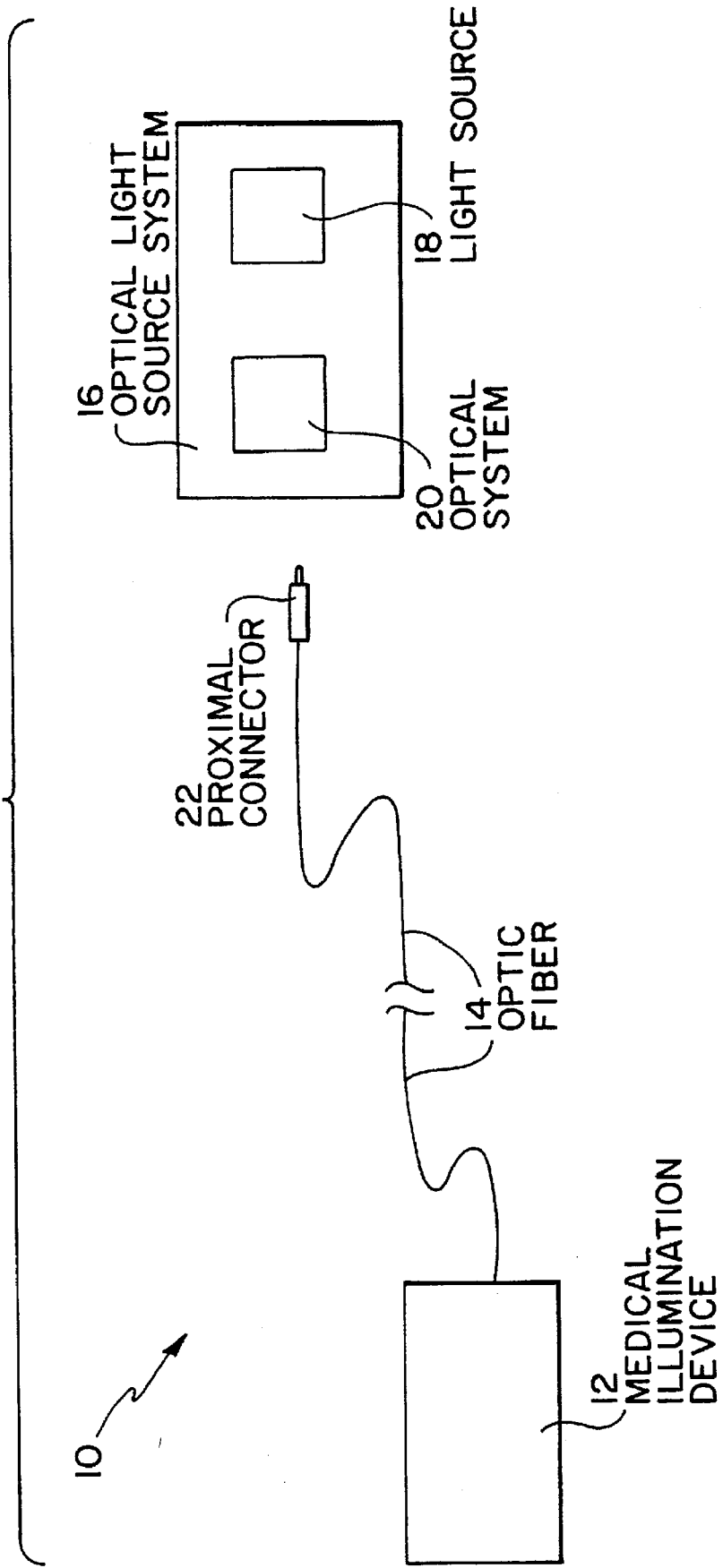
FIG. 1 is block diagram illustrating a medical illumination system providing light from an light source system to a single optical fiber into a medical illumination device.

FIG. 1 illustrates an illumination system 10 having, for example, a medical device 12 connected through a single fiber optic 14 to a light source system 16. Medical device 12 may be a surgical headlamp, surgical luminaire, endoscope, borescope, etc. Light source system 16 includes a high intensity light source 18, such as a metal halide or xenon arc lamp, and an optical system 20 for collecting and condensing light from source 18. Optical system 20 may include one or more optical elements such as mirrors, configured, for example, in accordance with the source system described in U.S. Pat. No. 4,757,431.

Fiber optic 14 includes a proximal connector 22 configured for "snap" insertion into an aperture formed in a receiving block of a housing of light source system 16. Proximal connector 22 and the receiving block in which it is inserted will now be described with reference to the remaining figures.

Figure 2:
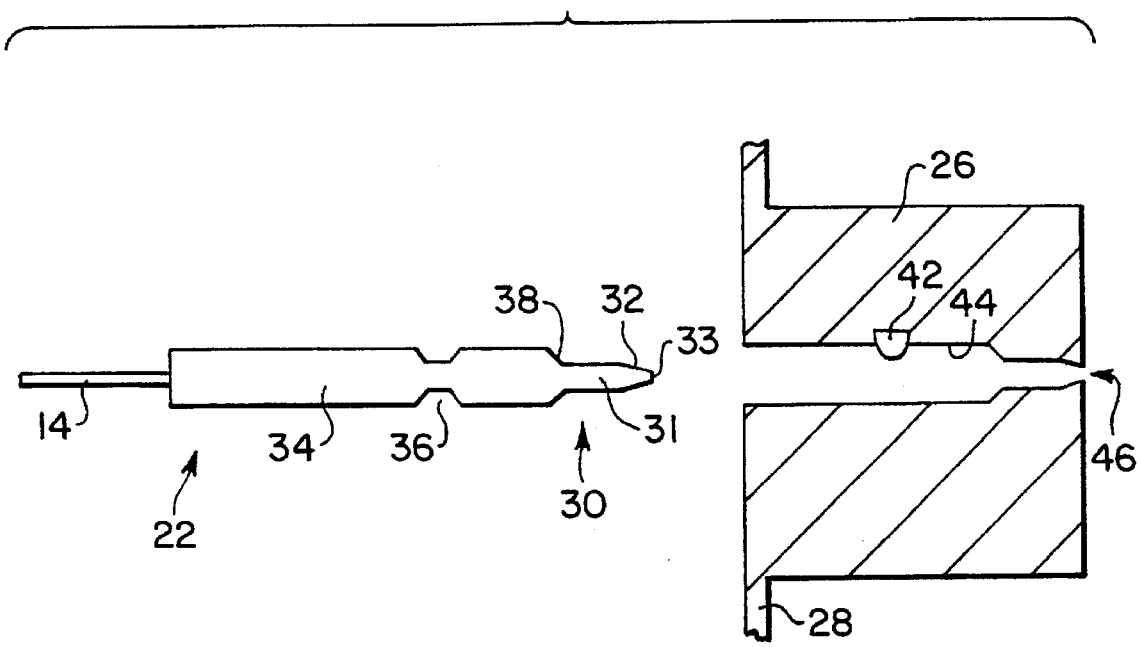
FIG. 2 is a sideview, partially in cross-section, of a proximal connector of the fiber optic of FIG. 1 and a portion of a housing of the light source system of FIG. 1.

FIG. 2 provides a sideview of proximal connector 22 positioned prior to insertion into an aperture 24 of a receiving block 26 of a housing 28 of light source system 16. Proximal connector 22 includes a three-dimensional symmetrical profile matching the interior profile of aperture 24. More specifically, proximal connector 22 includes a stainless steel ferrule 30 having a cylindrical base portion 31 and a tapering cone-shaped tip 32 with a truncated end 33. Base portion 31 is mounted within a case 34 which is substantially right-cylindrical but includes an indented ring 36 offset a distance from a tapered, truncated portion 38. Optic fiber 14 is held within an internal bore within case 34 and ferrule 30. An entrance aperture 40 of optic fiber 14 lies flush with the front truncated end 33 of ferrule 30.

Figure 3:
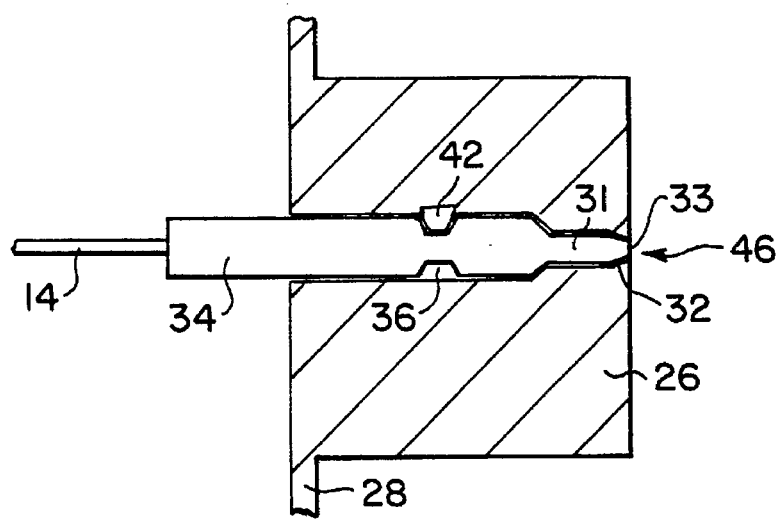
FIG. 3 is a sideview, partially in cross-section, of the elements of FIG. 2 shown with the proximal connector fully inserted within an aperture of the receiving block.

As noted, the profile of the proximal connector is matched to the internal profile of aperture 24. In other words, aperture 24 includes cylindrical and conical portions having substantially the same size and shape as corresponding portions of the proximal connector. One exception, however, is that the aperture does not define an outwardly extending ring shaped to match indented ring 36. Rather, a ball plunger spring-biasing mechanism 42 is mounted along an inner sidewall 44 of housing block 26. Ball plunger 42 is positioned such that it engages with indented ring 36 only while the proximal connector is fully inserted within aperture 24. This is illustrated in FIG. 3. Ball plunger 42 thus allows the proximal connector to be snapped into place during insertion.

The ball plunger prevents the proximal connector from accidentally sliding out of the aperture. The proximal connector can only be manually removed by pulling on the proximal connector with sufficient force to displace the ball plunger out of the indented ring allowing free removal of the connector. Of course, alternative biasing mechanisms may be employed. For example, the ball plunger may be mounted to the case of the proximal connector with the ring formed within the housing. As an another alternative, the case may be formed with a resilient outwardly extending ring and the aperture formed with a matching ring. Upon insertion of the proximal connector, the resilient ring of the case bends inwardly slightly until reaching the matching ring of the housing then snaps outwardly into the matching ring of the housing.

Continuing with the embodiment of the figures, the profile of the proximal connector is matched to the internal profile of the aperture of the receiving block, in part, to facilitate heat transfer from the connector into the receiving block. In use, high intensity light is focused or condensed or otherwise directed to a point or spot 46 which corresponds to the entrance aperture of the optic fiber while the connector is inserted in the receiving block. The intensity of light in the vicinity of 46 causes ferrule 30 to heat. However, heat generated within the ferrule is quickly conducted away from the tip of the ferrule and ultimately into the receiving block. To facilitate heat transfer, both the ferrule and the receiving block are preferably formed of materials having a high index of heat conduction. A suitable material is stainless steel. By conducting heat away from the tip of the ferrule, the ferrule remains relatively cool such that, on removal of the proximal connector, the ferrule does not need to be shielded and the persons touching the tip of the ferrule are not at risk from being burned.

Preferably, the dimensions of the proximal connector and of the aperture are fabricated to fairly close tolerances to ensure that the ferrule of the proximal connector contacts the inner walls of receiving block over the entire external surface area of the ferrule. Any gaps therebetween may hinder the conduction of heat from the ferrule.

As noted, ferrule 30 may be formed of stainless steel. In one embodiment, case 34 is formed of plastic. However, for some applications, perhaps to provide even greater heat conduction, case 34 may also be formed of stainless steel. As can be appreciated, wide variety of choices of materials can be employed consistent with the principles of the invention. Likewise, although the particular cylindrical and conical shapes thus far described have been found to be effective, other shapes may also be effective. Of course, for whatever shapes are chosen, the shape of the ferrule should closely match the shape of the corresponding aperture, at least within the region of expected heat conduction. In other words, portions of the proximal connector and aperture which are remote from the end of the fiber need not match as closely since less heat conduction is required at positions remote from the end of the optic fiber.

Another aspect of the configuration of the proximal connector and of the aperture is that both are substantially axially symmetric. Hence, the proximal connector can be freely rotated within the aperture without displacing the entrance aperture of the optic fiber. Hence, precise axial positioning is maintained. Lateral positioning of the tip of the fiber along the direction of insertion is maintained by the ball plunger which rests within indented ring 36. Precise positioning of the entrance aperture of the fiber is thereby maintained. As noted above, because the entrance aperture of the fiber lies flush with the truncated end of the ferrule, the entrance aperture can be polished to provide improved optical characteristics.

Figure 4:
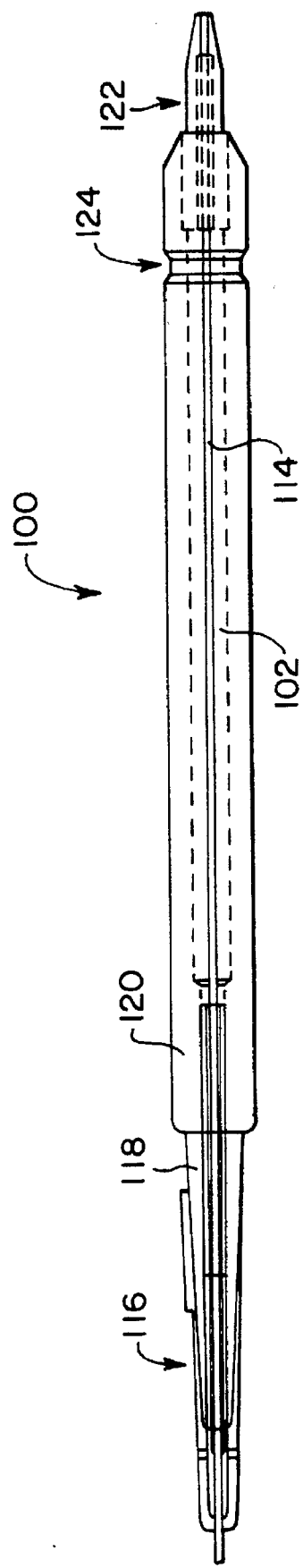
FIG. 4 is a sideview of a specific proximal connector showing internal components in phantom lines.

FIG. 4 provides a cross sectional illustration of a specific proximal connector configured as generally described with reference to FIGS. 1–3. In particular, FIG. 4 illustrates the internal structure of the proximal connector which holds the fiber optic. More specifically, proximal connector 100 of FIG. 4 includes a bore 102 through which fiber optic 114 passes. A distal portion of the optic fiber is secured by a clasp member 116 which also mounts to a cone-shaped distal end 118 of case 120. As with the proximal connector of FIGS. 2 and 3, proximal connector 100 of FIG. 4 includes a ferrule having a conic end 122. Case 120 also includes an indented longitudinally extending ring 124.

What has been described is an improved proximal connector for use with an optical illumination system employing a single optic fiber. In particular, the invention enables the use of temperature sensitive materials in the construction of single optical fibers. Principles of the invention, however, can be applied to other systems and to other applications as well. For example, principles of the invention may be applicable to optical illumination systems incorporating other optical fiber elements such as fiber bundles or the like.

What is claimed is:

1. In a system for coupling light from a high intensity light source into an optic fiber element wherein the source is within a housing and wherein the optic fiber element is removably inserted within an aperture formed in the housing, an improvement comprising:

mounting an end of the fiber element within a cone-shaped ferrule; and configuring the aperture of the housing with a cone-shape sized for closely receiving said cone-shaped ferrule, such that precise alignment between the optic fiber element and the system for coupling light is preserved and heat transfer away from the optic fiber element is facilitated, wherein the ferrule is mounted within a housing and wherein said housing has a longitudinally extending indented ring and wherein the aperture includes a spring-loaded ball plunger positioned to engage with the indented ring only when the ferrule is fully inserted within the aperture.

2. The improvement of claim 1, wherein the optic fiber element is a single optic fiber.

3. A fiber optic apparatus comprising:

an optic fiber element; and a cone-shaped ferrule mounted to an end of said optic fiber element, said cone-shaped ferrule having a truncated end aligned with an entrance aperture of said optic fiber element wherein the ferrule is comprised of a material having a high index of heat conduction, wherein said ferrule is a portion of a connector member attached to said fiber element, which connector member further comprises a case member surrounding a portion of said fiber element and attached to said ferrule, said case member having a longitudinally extending indented ring.

4. The apparatus of claim 3 wherein the material is stainless steel.

5. The apparatus of claim 3 wherein the optic fiber element is a single optic fiber.

6. A light source system for coupling light into an optic fiber element, said system comprising:

a housing;

an optical system mounted within said housing;

a receiving block having an aperture for releasably receiving an optic fiber element; and a light source for providing high intensity light;

with said source, said optical system and said aperture positioned for coupling light from said source into the optic fiber element; and with the aperture having an inner sidewall of a cone-shape for closely receiving a cone-shaped ferrule mounted around an end of the optic fiber, wherein the sidewall of the aperture is formed from a material having a high index of heat conduction, and wherein said ferrule is a portion of a connector member attached to said fiber element, which connector member further comprises a case member surrounding a portion of said fiber element and attached to said ferrule, said case member having a longitudinally extending indented ring.

7. The system of claim 6 wherein the material is stainless steel.

8. A light source system for coupling light into an optic fiber element, said system comprising:

a housing;

an optical system mounted within said housing;

a receiving block having an aperture for releasably receiving an optic fiber element; and a light source for providing light;

with said source, said optical system and said aperture positioned for coupling light from said source into the optic fiber element; and with the aperture having an inner sidewall of a cone-shape for closely receiving a cone-shaped ferrule mounted around an end of the optic fiber, wherein the inner sidewall of the receiving block has a spring-loaded ball plunger positioned for engaging a longitudinal indented ring formed on the ferrule only while the ferrule is fully inserted within the aperture.

9. The system of claim 8 wherein the optical source is an arc lamp.

10. The system of claim 8 wherein the optic fiber element is a single optic fiber.

11. The system of claim 8, wherein the optic fiber element is a single optic fiber.

12. In a system for coupling light from a high intensity light source into an optic fiber element wherein the source is within a housing and wherein the optic fiber element is removably inserted within an aperture formed in the housing, an improvement comprising:

mounting an end of the fiber element within a cone-shaped ferrule;

configuring the aperture of the housing with a cone-shape sized for closely receiving said cone-shaped ferrule, such that precise alignment between the optic fiber element and the system for coupling light is preserved and heat transfer away from the optic fiber element is facilitated, wherein the ferrule and the sidewalls of the aperture of the housing are both constructed from a material having a high index of heat conduction, and wherein said ferrule is a portion of a connector member attached to said fiber element, which connector member further comprises a case member surrounding a portion of said fiber element and attached to said ferrule, said case member having a longitudinally extending indented ring for engaging a corresponding engagement member of said housing when said ferrule is inserted within said aperture.

* * * * *